US008596558B2

(12) United States Patent
Lai

(10) Patent No.: US 8,596,558 B2
(45) Date of Patent: Dec. 3, 2013

(54) FINGER-OPERATED SWITCH

(75) Inventor: Cheng-Chung Lai, Taichung (TW)

(73) Assignee: Yuan-Mei Corp., Taichung (TW)

( * ) Notice: Subject to any disclaimer, the term of this patent is extended or adjusted under 35 U.S.C. 154(b) by 2 days.

(21) Appl. No.: 13/067,991

(22) Filed: Jul. 14, 2011

(65) Prior Publication Data

US 2013/0015270 A1 Jan. 17, 2013

(51) Int. Cl.

| | |
|---|---|
| ***B05B 7/02*** | (2006.01) |
| ***B05B 9/01*** | (2006.01) |
| ***F16K 25/00*** | (2006.01) |

(52) U.S. Cl.

USPC ............................ 239/526; 239/525; 251/175

(58) Field of Classification Search

USPC ......... 239/525, 526, 527, 375, 407, 413, 414, 239/415, 528, 318, 582.1, 581.1, 581.2; 251/175, 192, 302, 356; 173/170

See application file for complete search history.

(56) References Cited

U.S. PATENT DOCUMENTS

| | | | | | |
|---|---|---|---|---|---|
| 2,535,310 | A | * | 12/1950 | Mattison | 251/9 |
| 2,753,219 | A | * | 7/1956 | Matarese | 239/456 |
| 3,672,575 | A | * | 6/1972 | Hinrichs | 239/445 |
| 3,863,843 | A | * | 2/1975 | Hechler, IV | 239/318 |
| 4,173,234 | A | * | 11/1979 | Thomas et al. | 137/625.47 |
| 4,541,568 | A | * | 9/1985 | Lichfield | 239/441 |
| 4,609,177 | A | * | 9/1986 | Turner et al. | 251/175 |
| 4,619,403 | A | * | 10/1986 | Goldney et al. | 239/456 |
| 4,889,162 | A | * | 12/1989 | Newcombe et al. | 137/606 |
| 5,076,540 | A | * | 12/1991 | Murphy | 251/175 |
| 5,944,258 | A | * | 8/1999 | Chih | 239/318 |
| 5,984,207 | A | * | 11/1999 | Wang | 239/526 |
| 6,073,863 | A | * | 6/2000 | Wang | 239/525 |
| 6,367,716 | B1 | * | 4/2002 | Wang | 239/526 |
| 6,425,538 | B1 | * | 7/2002 | Heren | 239/526 |
| 6,435,515 | B1 | * | 8/2002 | Galletti | 277/407 |
| 6,471,141 | B2 | * | 10/2002 | Smith et al. | 239/10 |
| 6,789,339 | B2 | * | 9/2004 | Blease | 40/593 |
| 6,796,515 | B2 | * | 9/2004 | Heren et al. | 239/526 |
| 6,805,306 | B1 | * | 10/2004 | Huang | 239/375 |
| 7,000,855 | B1 | * | 2/2006 | Chen | 239/526 |
| 7,007,868 | B1 | * | 3/2006 | Chen | 239/525 |
| 7,025,291 | B2 | * | 4/2006 | Wu | 239/526 |
| 7,066,406 | B2 | * | 6/2006 | Williams et al. | 239/375 |
| 7,124,965 | B1 | * | 10/2006 | Chen | 239/525 |
| 7,240,858 | B2 | * | 7/2007 | Wang | 239/526 |
| 7,294,022 | B1 | * | 11/2007 | Cheng | 439/668 |
| 7,328,860 | B1 | * | 2/2008 | Chen | 239/581.1 |
| 7,341,206 | B2 | * | 3/2008 | Hubmann et al. | 239/302 |
| 7,377,456 | B2 | * | 5/2008 | Wang | 239/526 |

(Continued)

*Primary Examiner* — Len Tran

*Assistant Examiner* — Alexander M Valvis

(74) *Attorney, Agent, or Firm* — Raymond Y. Chan; David and Raymod Patent Firm

(57) ABSTRACT

A finger-operated switch is revealed. The finger-operated switch includes a main body and a switch. The main body includes an intake channel, a turning channel and an outlet channel connected sequentially. On end of the outlet channel near the turning channel is arranged with an outlet and mounted with a waterproof gasket. The switch including a rotating shaft and a waterproof spacer is set on the rotating shaft. There is a certain distance between the turning channel and the rotating shaft mounted therein. The waterproof spacer is floatable in and moving synchronously with the rotating shaft. While adjusting the rotating shaft, the waterproof spacer is driven to close or open the outlet of the waterproof gasket. When the outlet is closed, a pushing force is produced toward the outlet because water pressure in the turning channel presses the waterproof spacer. A watertight effect is achieved.

19 Claims, 13 Drawing Sheets

(56) References Cited

U.S. PATENT DOCUMENTS

| | | | | |
|---|---|---|---|---|
| 7,429,029 | B2 * | 9/2008 | Wang | 251/309 |
| 7,490,783 | B2 * | 2/2009 | Mueller et al. | 239/315 |
| 7,533,833 | B2 * | 5/2009 | Wang et al. | 239/526 |
| 7,753,288 | B2 * | 7/2010 | MacLean-Blevins | 239/310 |
| 8,048,379 | B2 * | 11/2011 | Sassoon | 422/124 |
| 8,087,597 | B2 * | 1/2012 | Cheng | 239/526 |
| 8,123,151 | B2 * | 2/2012 | Cheng | 239/586 |
| 8,381,769 | B2 * | 2/2013 | Hsieh | 137/614.19 |
| 2003/0006045 | A1 * | 1/2003 | Ebersole et al. | 169/14 |
| 2003/0189111 | A1 * | 10/2003 | Heren et al. | 239/570 |
| 2004/0222320 | A1 * | 11/2004 | Wu | 239/526 |
| 2006/0169801 | A1 * | 8/2006 | Zhu et al. | 239/525 |
| 2006/0249599 | A1 * | 11/2006 | Guo | 239/530 |
| 2007/0018019 | A1 * | 1/2007 | Nobili | 239/581.1 |
| 2008/0237369 | A1 * | 10/2008 | Hubmann et al. | 239/310 |
| 2011/0253813 | A1 * | 10/2011 | Lo | 239/723 |
| 2012/0056010 | A1 * | 3/2012 | Lo | 239/101 |

* cited by examiner

FINGER-OPERATED SWITCH

BACKGROUND OF THE INVENTION

1. Fields of the invention

The present invention relates to a finger-operated switch, especially to a finger-operated switch that controls on/off or flow rate of water channels.

2. Descriptions of Related Art

Generally, a conventional switch of a water gun operated by pushing and pulling of fingers includes a flow channel with a receiving space mounted in a stock. The receiving space is disposed with an upper cover with an operation window. A switch arranged in the receiving space includes a rotating shaft, a housing of the rotating shaft, and a fine tuning switch. The housing of the rotating shaft mounted in the receiving space and fixed on and connected to the stock. The housing of the rotating shaft includes a rotating shaft hole. An inlet and an outlet connected to the flow channel are mounted on a side wall of the housing of the rotating shaft. The rotating shaft arranged with a water channel is mounted in the rotating shaft hole. The water channel is connected to the inlet and the outlet. One end of the fine tuning switch is fixed on and connected to one end of the rotating shaft while the other end thereof is connected to the housing of the rotating shaft. An upper part of the fine tuning switch is set in the operation window of the upper cover. The rotating shaft includes a water-sealing part and a first sealing ring. When the fine tuning switch is operated, the rotating shaft is driven to rotate synchronously so as to drive the water-sealing part closing or opening the inlet.

When the inlet is closed by the water-sealing part moved by the fine tuning switch, a pushing force is produced continuously from the inlet to the water-sealing part due to water pressure in the flow channel. This leads to poor waterproofing between the water-sealing part and the rotating shaft.

Thus conventional switches that control intake/outlet of water flow all have problems of poor waterproofing.

SUMMARY OF THE INVENTION

Therefore it is a primary object of the present invention to provide a finger-operated switch formed by a main body and a switch. The main body consists of an intake channel, a turning channel and an outlet channel connected sequentially. The main body can be a stock of a water gun, a base of various types of faucets, or a connection pipe of pipelines. The switch is disposed on the turning channel to control water flowing to the outlet channel or not. While adjusting the switch to close the outlet channel, a larger pushing force is generated along with the increasing water pressure in the turning channel. Thus a better waterproof effect is achieved.

In order to achieve the above object, a finger-operated switch of the present invention includes a main body and a switch. The main body consists of an intake channel, a turning channel and an outlet channel, connected each other in order. The turning channel is respectively connected to the outlet channel and the intake channel perpendicularly. An inlet of the outlet channel near the turning channel is sleeved with a long-and-narrow waterproof gasket. The waterproof gasket has a penetrating outlet. One end of the waterproof gasket projects a bit from the inlet and this end can be completely sealed by an outer curved surface of a waterproof spacer of the switch. An outlet of the outlet channel is arranged with a stop collar. A penetrating channel is disposed along a shaft of the stop collar and is connected to the outlet of the waterproof gasket. Moreover, an outer end of the stop collar is mounted into an outlet of the waterproof gasket closely.

The switch is formed by a rotating shaft, a waterproof spacer and a finger-operated member. The rotating shaft is mounted in the turning channel with a certain distance therebetween. A cap is arranged at each of two ends of the rotating shaft symmetrically for closing two opening ends of the turning channel. The cap is disposed with a circular slot and a seal ring is mounted in the circular slot. An outer edge of the seal ring is closely attached to an inner wall of the turning channel. At least one side of the rotating shaft is arranged with a stop groove. A fastening slot is disposed on an outer side of each of the two covers so as to connect with the finger-operated member. The waterproof spacer is a long curved plate, having an outer curved surface and an inner curved surface. A long convex disposed on the inner curved surface is mounted in the stop groove of the rotating shaft so that the waterproof spacer and the rotating shaft are moved synchronously. After the long convex being mounted into the stop groove, there is a preset gap between the waterproof spacer and the rotating shaft and the gap allows the waterproof spacer floatable. The outer curved surface is used to close the outlet of the waterproof gasket. The finger-operated member includes two parallel clip-on workpieces on each of two sides thereof, projecting pieces and a push member. The clip-on workpieces are disposed on an outer side of the two caps of the rotating shaft. The projecting piece is arranged at an inner side of each clip-on workpiece and is mounted into the fastening slot of the cap so that the finger-operated member and the rotating shaft can be moved synchronously. The push member is connected to a top of the finger-operated member for repeated operation of the finger-operated member.

When the finger-operated member is pushed forward or backward, the rotating shaft is driven synchronously to rotate in the turning channel. Due to the preset gap between the waterproof spacer and the rotating shaft, the waterproof spacer is moveable while the rotating shaft rotating in the turning channel. Thus the waterproof spacer is moved smoothly while rotating in an inner wall of the turning channel. When the waterproof spacer is moved away from the outlet of the waterproof gasket, water flow passes through the intake channel, the turning channel, the distance between the turning channel and the rotating shaft, the outlet of the waterproof gasket and out of the penetrating channel of the stop collar. While rotating the waterproof spacer for driving the outer curved surface to close the outlet of the waterproof gasket, a pushing force is produced from the waterproof spacer to the waterproof gasket due to water pressure of stagnant water in the turning channel. The pushing force is getting larger along with the increasing pressure in the turning channel. Thus the fitness between the waterproof spacer and the waterproof gasket is better. That means the larger the internal water pressure of the turning channel is, the better watertight effect is achieved.

Moreover, the waterproof gasket is made from a soft material while the waterproof spacer is made from a hard material. Thereby the outer curved surface presses the waterproof gasket so as to achieve better waterproofing while rotating the outer curved surface of the waterproof spacer to attach and contact with the waterproof gasket.

The stop collar and the outlet channel are connected by high frequency welding or other ways of connection available now.

One end of the outlet channel near the turning channel is disposed with a step-like first stopper while a step-shaped first outer stopper is arranged at one end of the waterproof gasket.

After the waterproof gasket being mounted into the outlet channel, the first outer stopper is leaning against the first stopper.

The main body of the finger-operated switch of the present invention can be a stock of a water gun, a base of various types of faucets, or a connection pipe of pipelines. When the main body is a stock of a water gun, a spray nozzle providing various spray patterns is connected to the end of the outlet channel with the outlet. Moreover, a cover with a window is arranged over the turning channel. The cover also covers the parallel clip-on workpieces of the finger-operated member while the push member of the finger-operated member is exposed outside the cover through the window. The finger-operated member and the push member are independent components and integrated with each other after being assembled. A connection part penetrating through the window of the cover is set on top of the finger-operated member. The connection part is arranged with a vertical through hole and at least one stop slot is mounted on an inner wall of the vertical through hole. One end of the push member is mounted into the vertical through hole tightly. The push member is arranged with a projecting part corresponding to the stop slot and the projecting part is locked into the stop slot. Furthermore, the width of the push member is larger than the width of the window so that the cover is stopped between the finger-operated member and the push member.

In addition, in order to assemble and fix the cover on the stock, at least one set of symmetrical inner slots is set on the stock, above the turning channel. At least one set of symmetrical tenons is disposed on an inner surface of the cover. The tenons are mounted into the corresponding inner slots so as to fasten and fix the cover on the stock.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
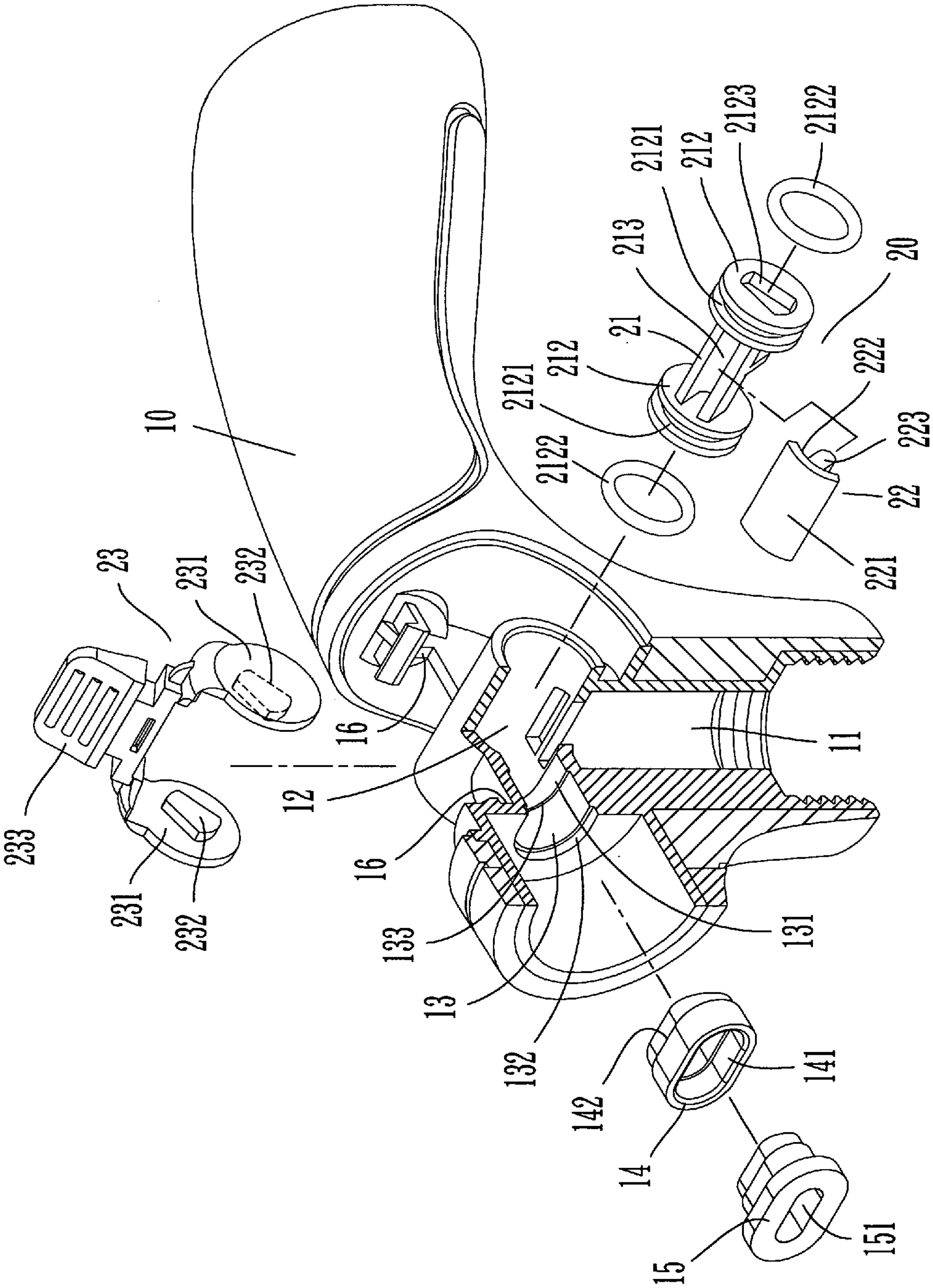
FIG. 1 is an explosive view of an embodiment according to the present invention.
Figure 2:
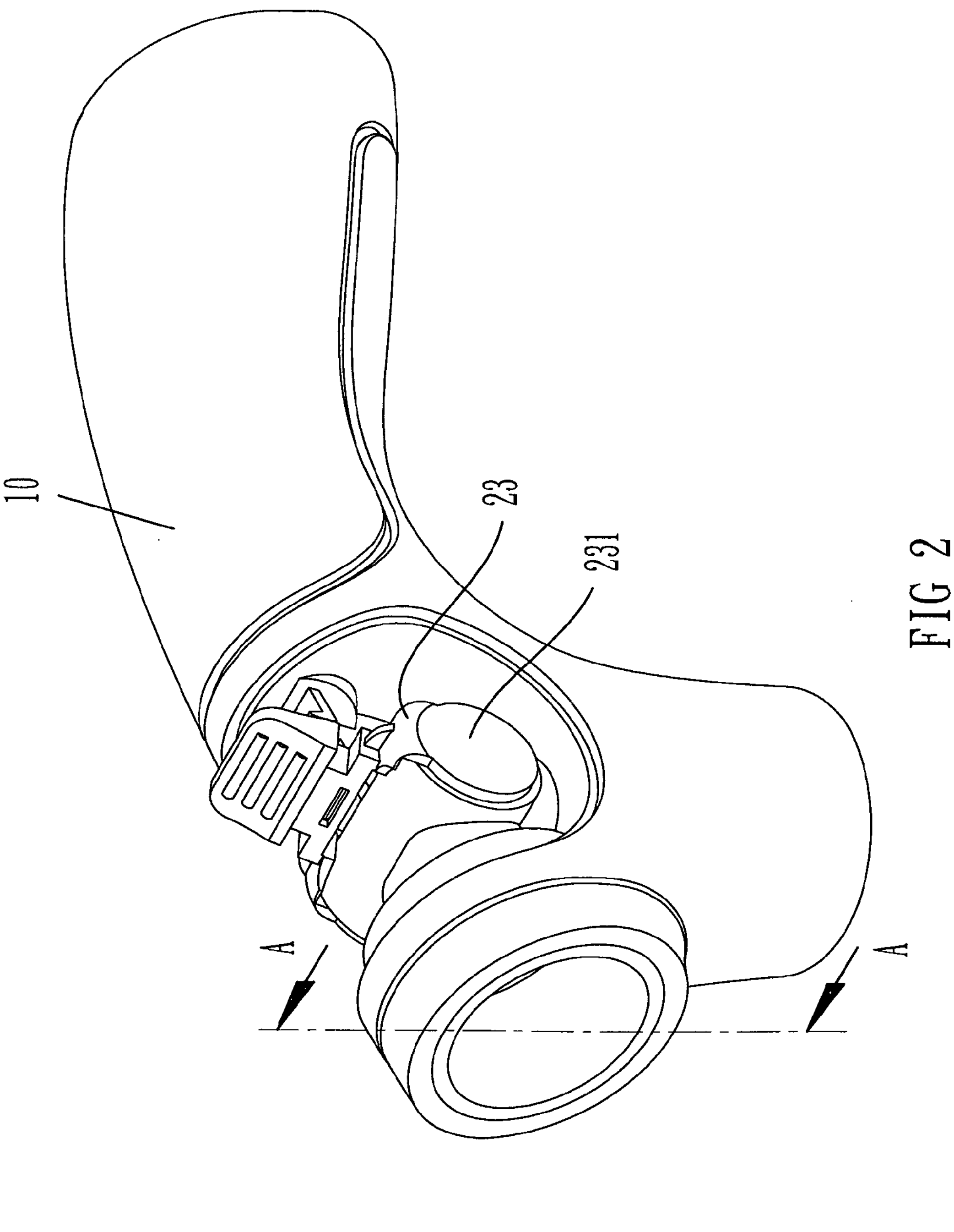
FIG. 2 is an assembled view of an embodiment according to the present invention.
Figure 3:
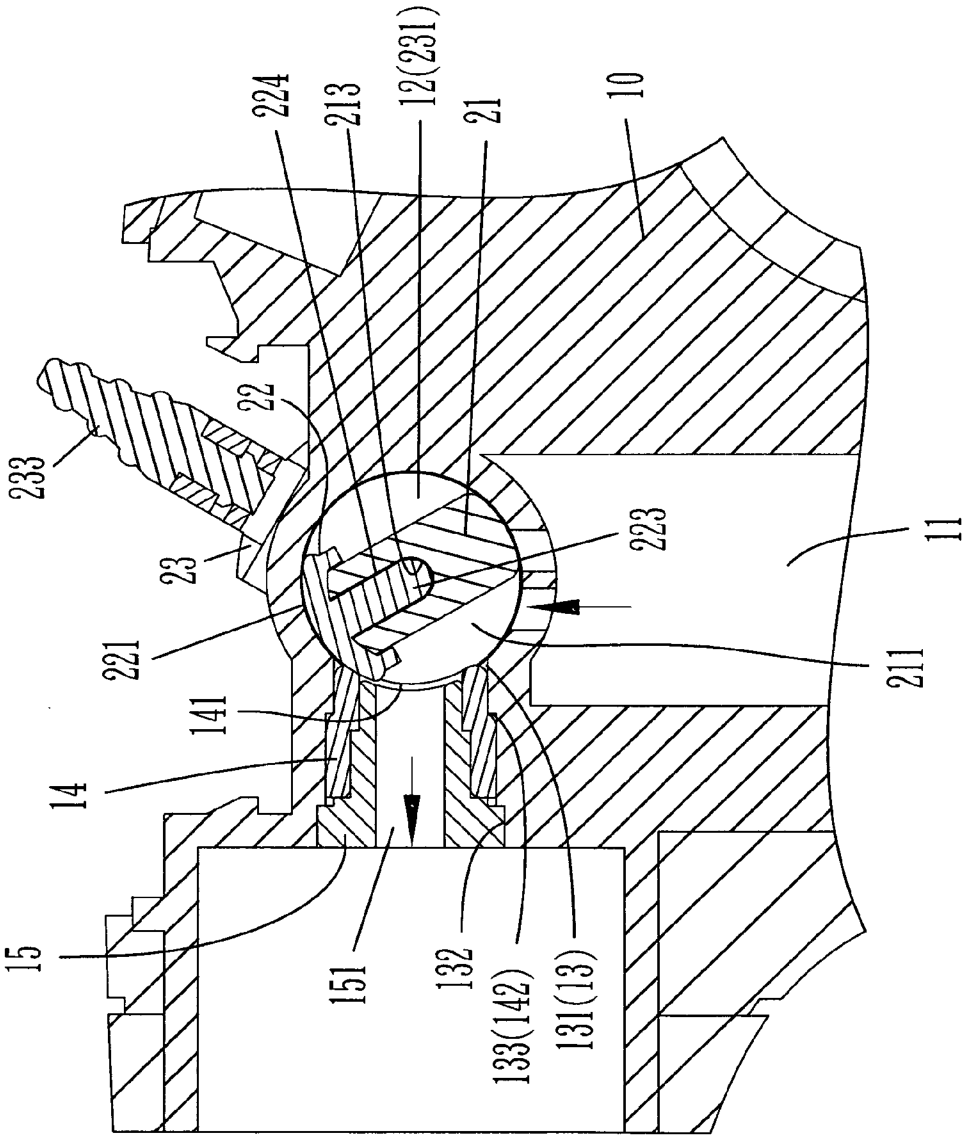
FIG. 3 is a cross sectional view along A-A line of the embodiment in FIG. 2.
Figure 4:
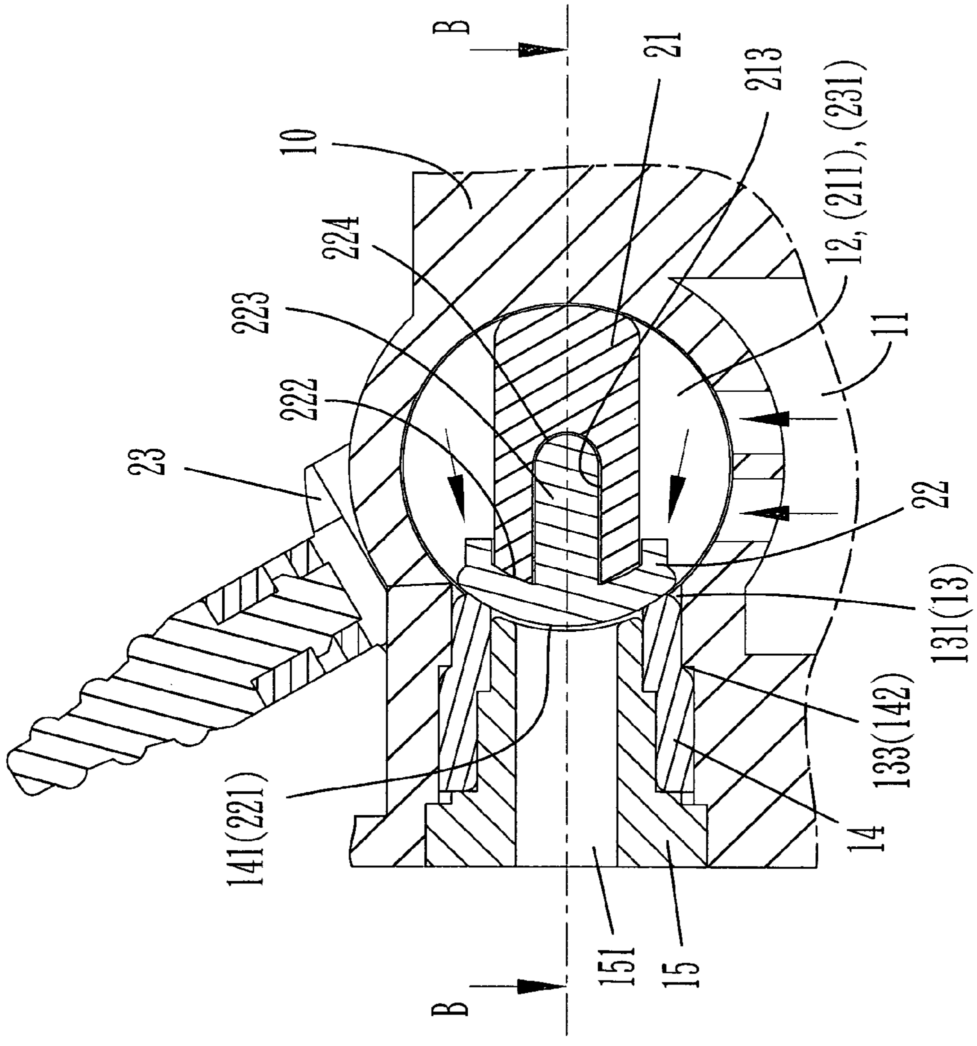
FIG. 4 is a partial enlarged view of the embodiment in FIG. 3 showing rotation of a rotating shaft so as to make an outlet of a waterproof gasket become closed by a waterproof gasket.
Figure 5:
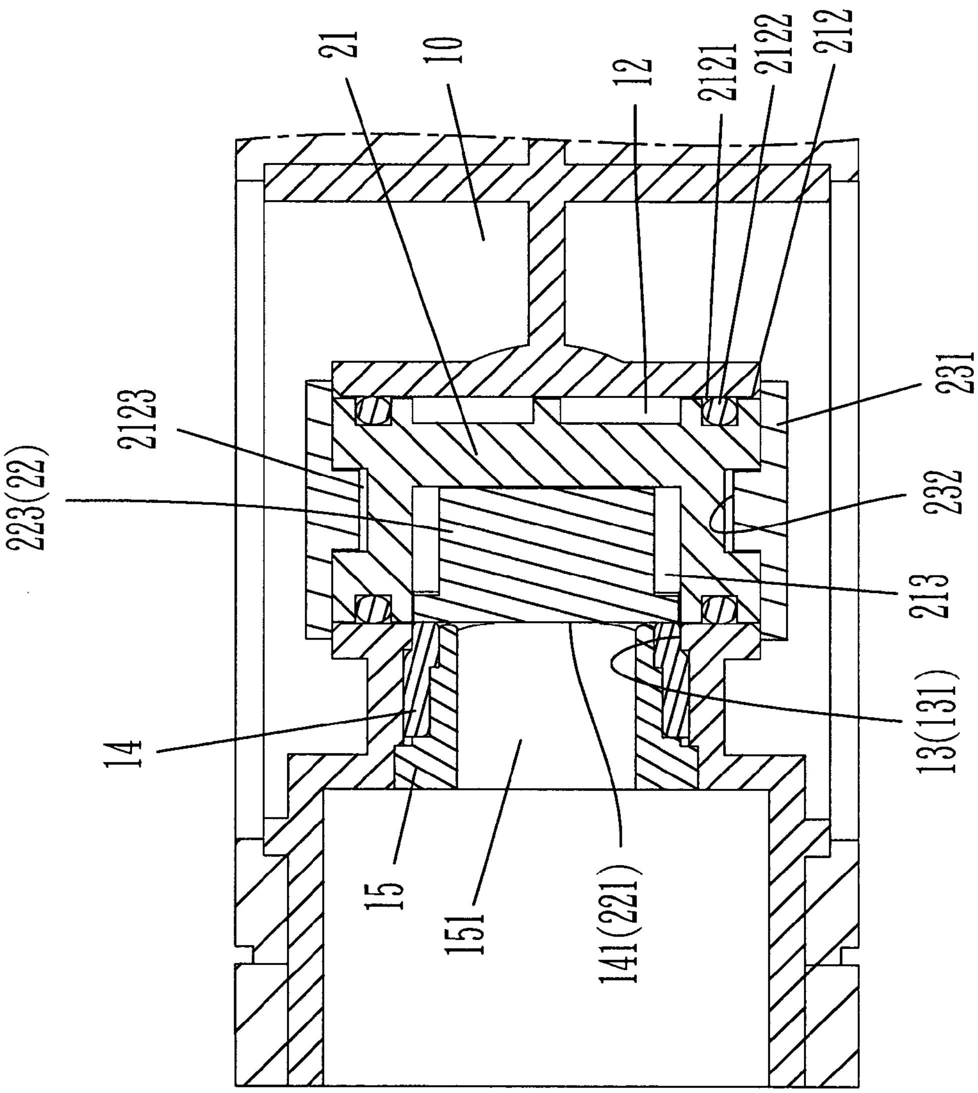
FIG. 5 is a cross sectional view along B-B line of the embodiment in FIG. 4.
Figure 6:
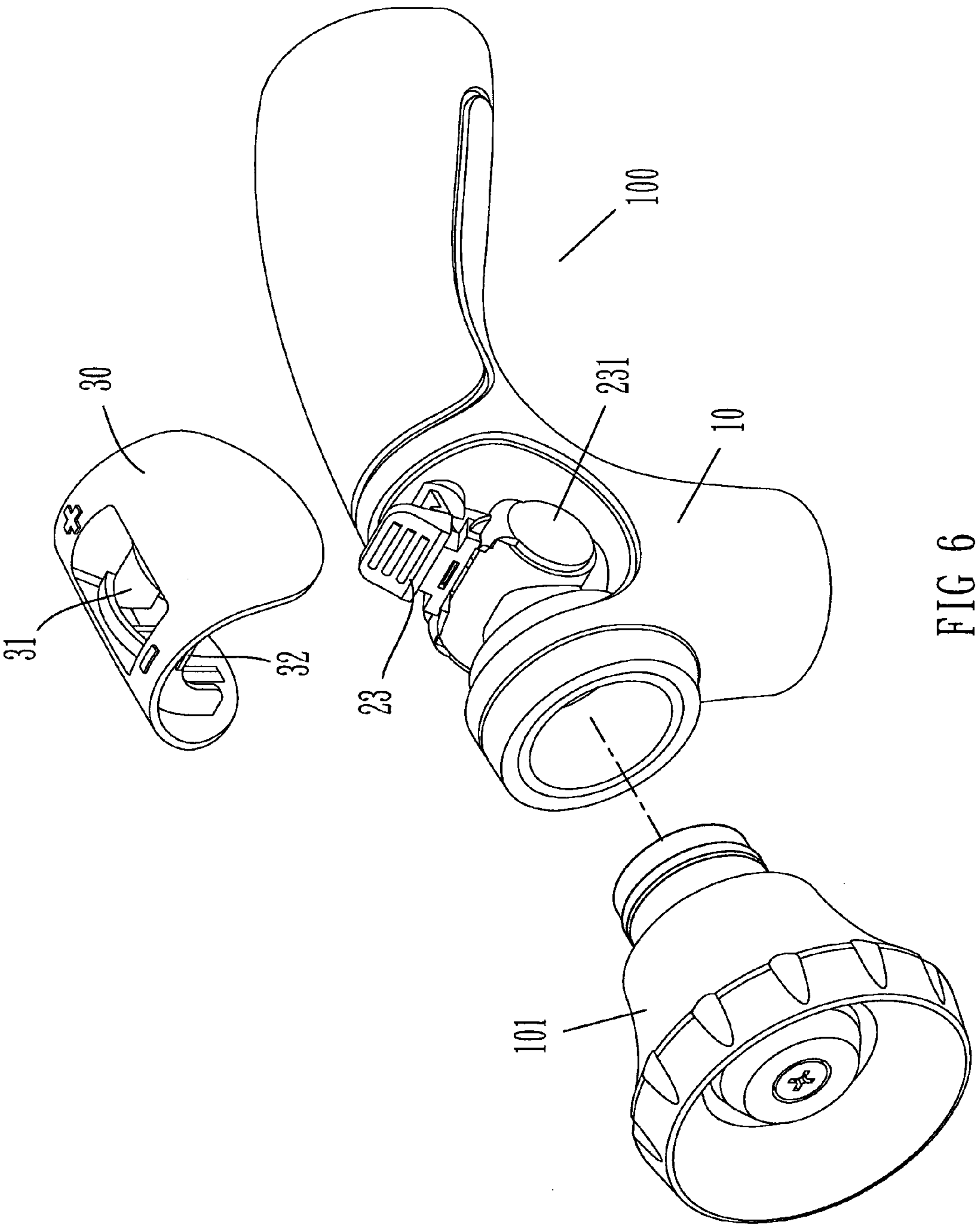
FIG. 6 is a schematic drawing showing a main body, a spray nozzle and a cover of an embodiment according to the present invention.

Refer from FIG. 1 to FIG. 5, a finger-operated switch includes a main body 10 and a switch 20.

The main body 10 consists of an intake channel 11, a turning channel 12 and an outlet channel 13, connected each other in sequence. The turning channel 12 is respectively connected to the outlet channel 13 and the intake channel 11 perpendicularly. An inlet 131 of the outlet channel 13 near the turning channel 12 is sleeved with a waterproof gasket 14. Both the outlet channel 13 and the waterproof gasket 14 are long and narrow. A penetrating outlet 141 is arranged along a shaft of the waterproof gasket 14. One end of the waterproof gasket 14 extends to and projects a bit from the inlet 131 of the outlet channel 13 after the waterproof gasket 14 assembled with the outlet channel 13. The inlet 131 is completely sealed by an outer curved surface 221 of a waterproof spacer 22 of the switch 20. An outlet 132 of the outlet channel 13 is corresponding to and mounted with a stop collar 15. A penetrating channel 151 is disposed along a shaft of the stop collar 15. An outer end of the stop collar 15 is mounted into the outlet 141 of the waterproof gasket 14 tightly so that the penetrating channel 151 and the outlet 141 are connected to each other.

The switch 20 is composed of a rotating shaft 21, a waterproof spacer 22 and a finger-operated member 23.

The rotating shaft 21 is mounted in the turning channel 12. After the rotating shaft 21 being mounted in the turning channel 12, there is a certain distance 211 therebetween. Each of two ends of the rotating shaft 21 is disposed with a cap 212 symmetrically so as to close opening ends of the turning channel 12. The cap 212 is disposed with a circular slot 2121 and a seal ring 2122 is mounted in the circular slot 2121. An outer edge of the seal ring 2122 is closely attached to an inner wall of the turning channel 12. Moreover, at least one side of the rotating shaft 21 is arranged with a stop groove 213. And a fastening slot 2123 for connecting with the finger-operated member 23 is arranged at an outer side of each of the two covers 212.

The waterproof spacer 22 is a long curved plate, having an outer curved surface 221 and an inner curved surface 222. A long convex 223 is disposed on the inner curved surface 222. After the long convex 223 being mounted in the stop groove 213 of the rotating shaft 21, there is a preset gap 224 between the waterproof spacer 22 and the rotating shaft 21. The gap 224 is located between the long convex 223 and the stop groove 213, allowing the waterproof spacer 22 floatable in relative to the rotating shaft 21. When the waterproof spacer 22 is assembled with the rotating shaft 21, the outer curved surface 221 is attached to and contacted with the inner wall of the turning channel 12 while the inner curved surface 222 is attached to and contacted with a side end surface of the stop groove 213 of the rotating shaft 21. The inner curved surface 222 can also be designed into a flat surface.

The finger-operated member 23 consists of two parallel clip-on workpieces 231 on each of two sides thereof, projecting piece 232, and a push member 233. The clip-on workpieces 231 are arranged on an outer side of the two caps 212 of the rotating shaft 21. The projecting piece 232 is disposed on an inner side of each clip-on workpiece 231 and is mounted into the fastening slot 2123 of the cap 212. Thus the finger-operated member 23 and the rotating shaft 21 can be moved synchronously with each other. The push member 233 is connected to a top of the finger-operated member 23 for convenience of repeated rotation and operation of the finger-operated member 23.

In accordance with the structure mentioned above, while operating the finger-operated member 23 of the switch 20 to move forward and backward repeatedly, the rotating shaft 21 is driven to rotate in the turning channel 12 synchronously. There is a preset gap 224 between the waterproof spacer 22 and the rotating shaft 21. Thereby the waterproof spacer 22 is floatable and rotatable due to the gap 224 while the rotating shaft 21 rotating in the turning channel 12. Thus the waterproof spacer 22 is moved smoothly and steadily while rotating in the inner wall of the turning channel 12. When the waterproof spacer 22 is rotated to move away from the outlet 141 of the waterproof gasket 14, water flow passes through the intake channel 11, the turning channel 12, the distance 211 between the turning channel 12 and the rotating shaft 21, the outlet 141 of the waterproof gasket 14 and out of the penetrating channel 151 of the stop collar 15. When the outlet 141 of the waterproof gasket 14 is closed completely by the outer curved surface 221 of the waterproof spacer 22 is a long curved plate, a pushing force is produced from the waterproof spacer 22 to the outlet 141 of the waterproof gasket 14 due to water pressure of stagnant water in the turning channel 12. The higher the internal pressure of the turning channel 12, the larger the pushing force. Thus the fitness between the waterproof spacer 22 and the waterproof gasket 14 is better. That means the larger the internal water pressure of the turning channel 12 is, the better watertight effect is achieved.

Moreover, the waterproof gasket 14 of the finger-operated switch according to the present invention is made from a kind of soft material while the waterproof spacer 22 is made from a kind of hard material. Thereby when the outer curved surface 221 of the waterproof spacer 22 is attached to and contacted with the corresponding end of the waterproof gasket 14, the outer curved surface 221 presses the waterproof gasket 14 so as to achieve better waterproofing.

The stop collar 15 and the outlet channel 13 are connected by high frequency welding or other ways of connection available now.

One end of the outlet channel 13 near the turning channel 12 is disposed with a step-like first stopper 133 while a step-shaped first outer stopper 142 is arranged at one end of the waterproof gasket 14. After the waterproof gasket 14 being mounted into the outlet channel 13, the first outer stopper 142 is leaning against the first stopper 133 to be stopped.

Refer from FIG. 6 to FIG. 9, the main body of a finger-operated switch according to the present invention can be a stock of a water gun 100, a base of various types of faucets, or a connection pipe of pipelines. In this embodiment, a stock of the water gun 100 is used as an example. The stock of the water gun 100 is equivalent to the main body 10 mentioned above. A spray nozzle 101 providing various spray patterns is connected to the end of the outlet channel 13 with the outlet 132. In the stock, a cover 30 with a window 31 is arranged over the turning channel 12 so as to cover the parallel clip-on workpieces 231 of the finger-operated member 23 while the push member 233 of the finger-operated member 23 is exposed outside the cover 30 through the window 31.

Figure 7:
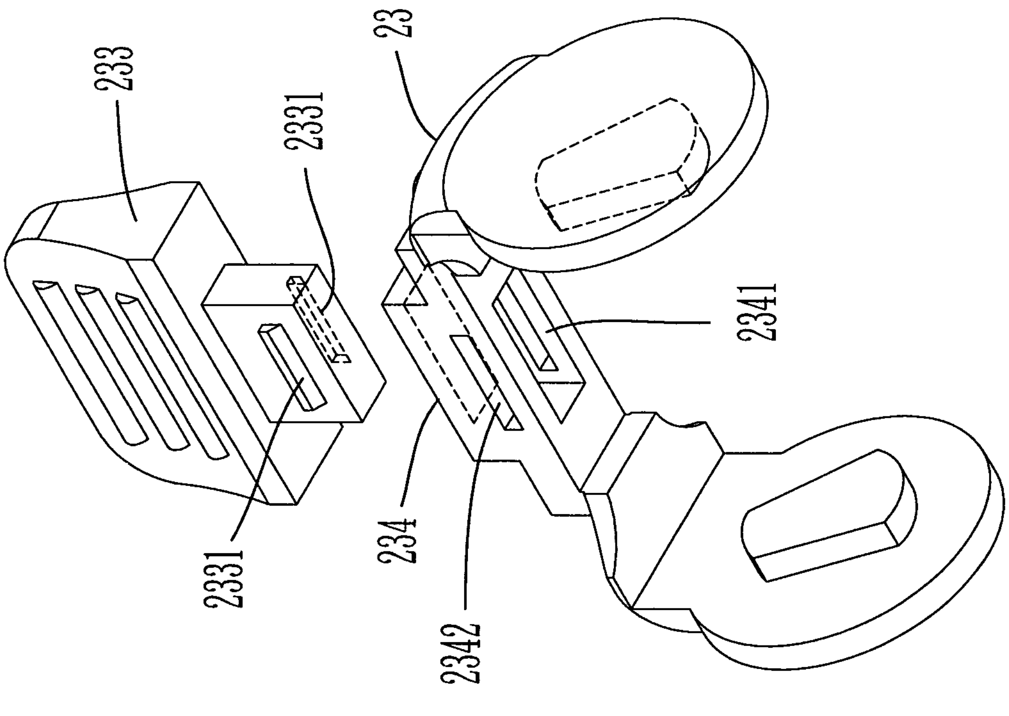
FIG. 7 is an explosive view showing a finger-operated member with a push member of an embodiment according to the present invention.
Figure 8:
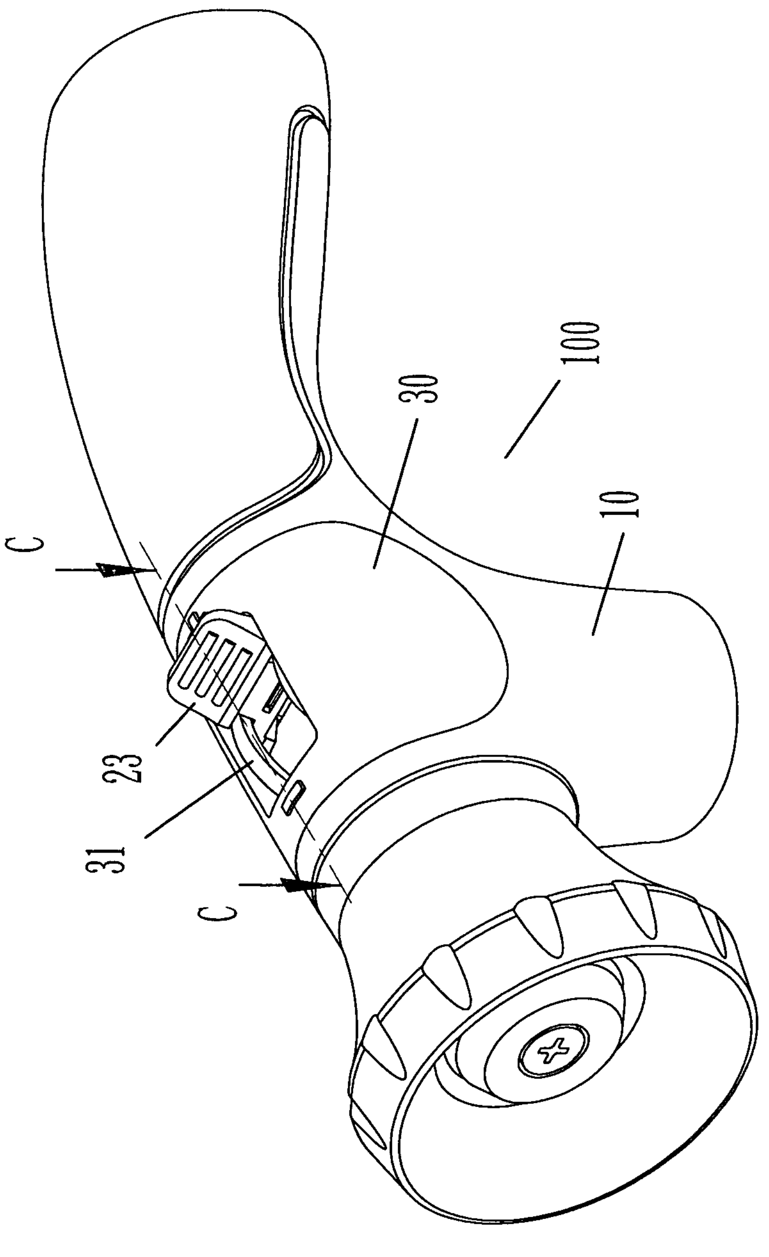
FIG. 8 is an assembled view of the embodiment in FIG. 6.
Figure 9:
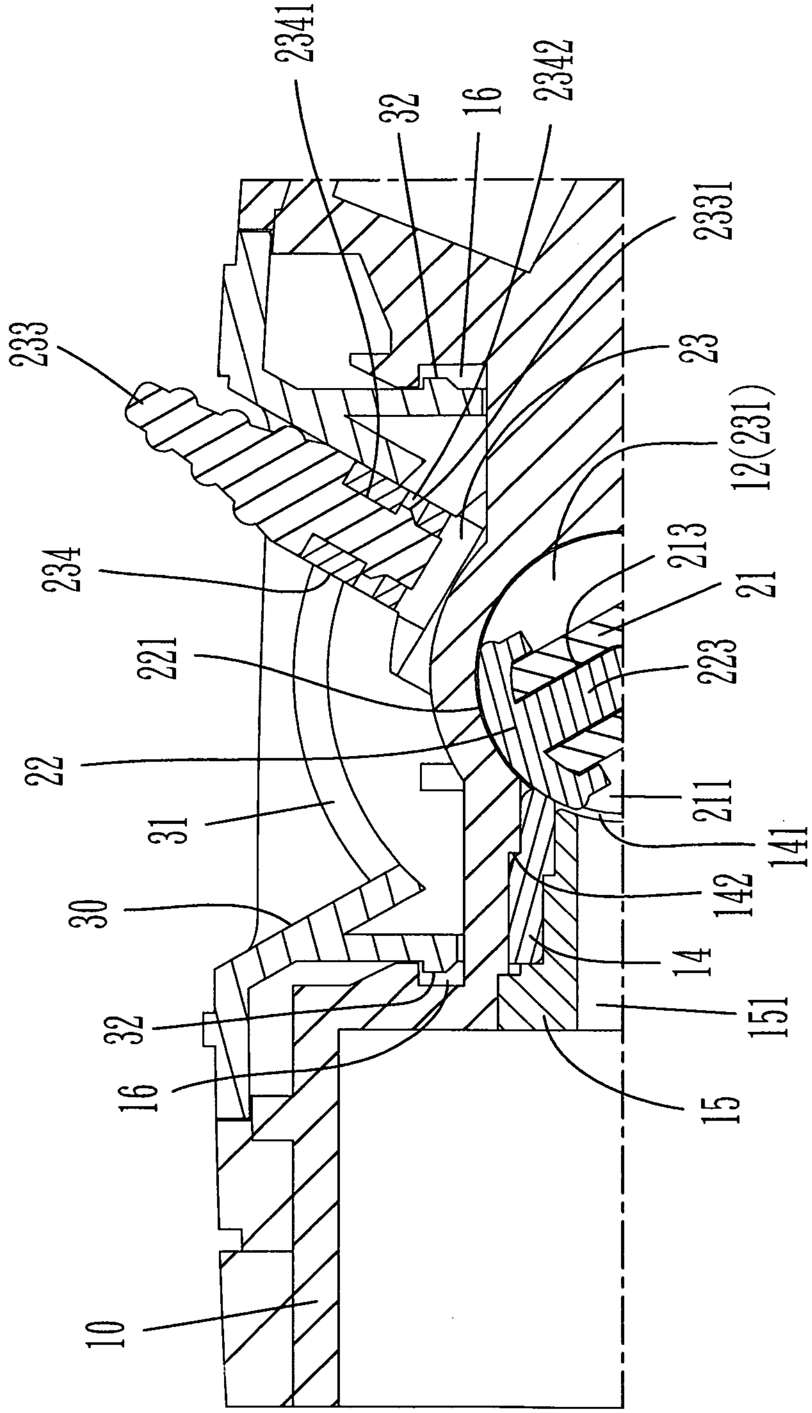
FIG. 9 is a cross sectional view along C-C line of the embodiment in FIG. 8.
Figure 10:
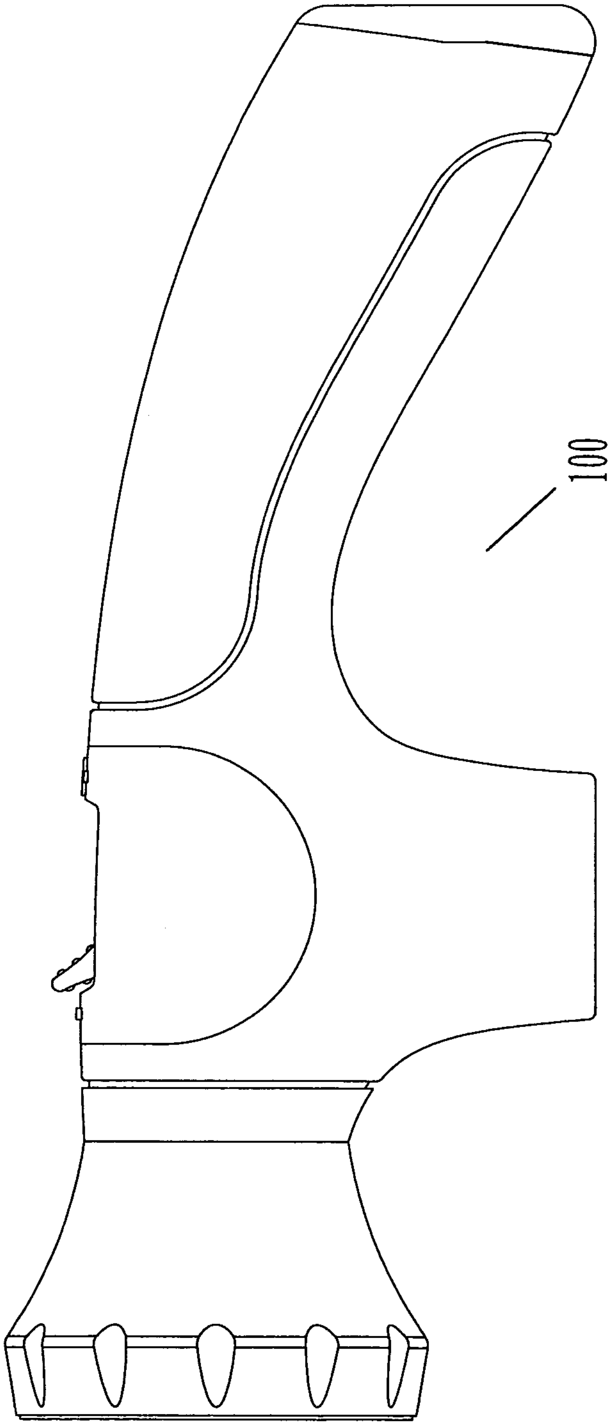
FIG. 10 is a front view of an embodiment applied to a water gun according to the present invention.
Figure 12:
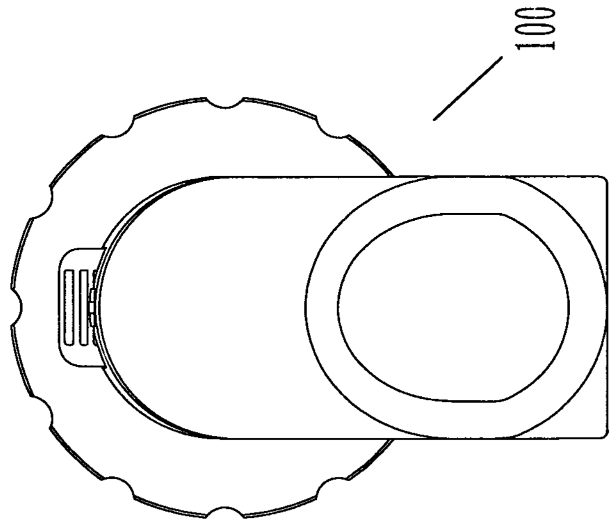
FIG. 12 is a right side view of an embodiment applied to a water gun according to the present invention.
Figure 11:
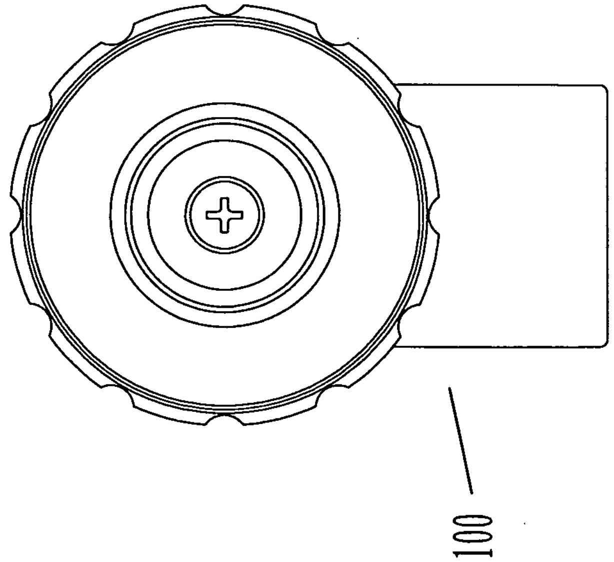
FIG. 11 is a left side view of an embodiment applied to a water gun according to the present invention.
Figure 13:
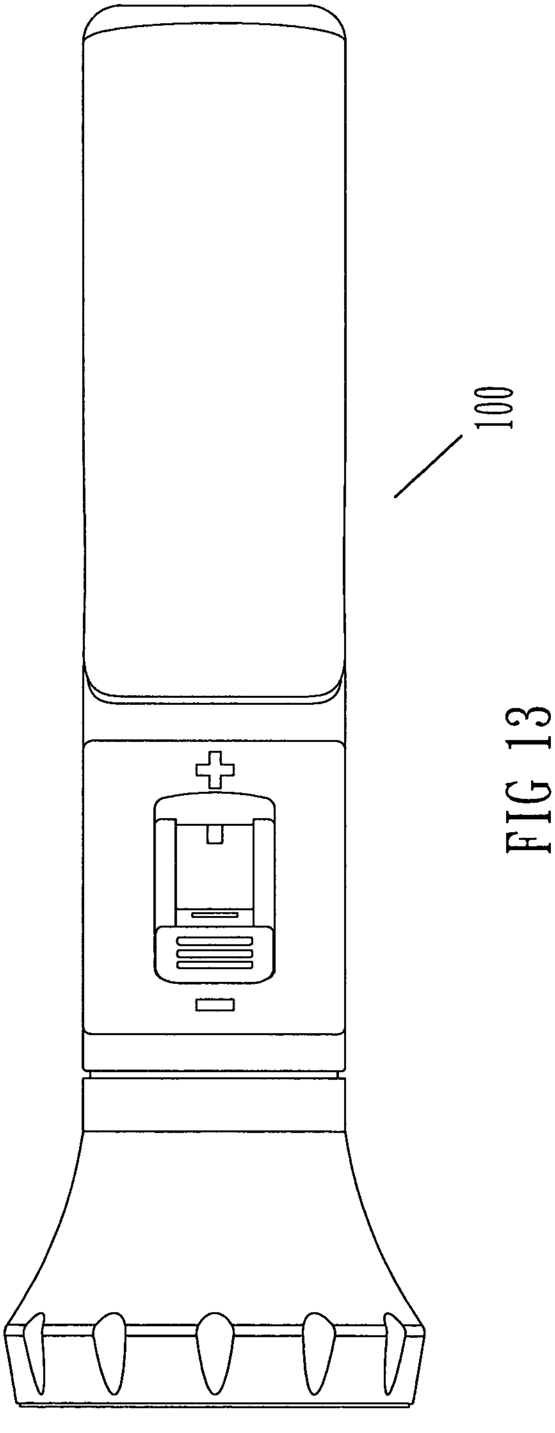
FIG. 13 is a top view of an embodiment applied to a water gun according to the present invention.
Figure 14:
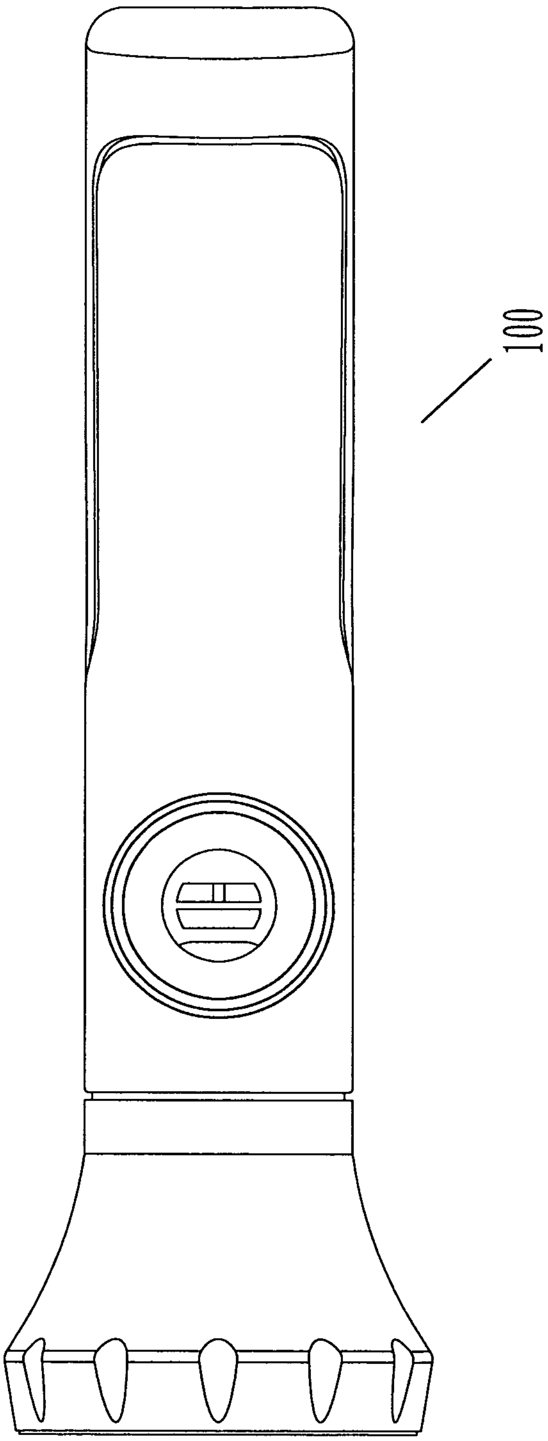
FIG. 14 is a bottom view of an embodiment applied to a water gun according to the present invention.

As shown in the FIG. 7 and FIG. 8, the finger-operated member 23 and the push member 233 are independent components and integrated with each other after being assembled. A connection part 234 is disposed on top of the finger-operated member 23 and is penetrating through the window 31 of the cover 30. The connection part 234 is arranged with a vertical through hole 2341 and at least one stop slot 2342 is mounted on an inner wall of the vertical through hole 2341. One end of the push member 233 is mounted into the vertical through hole 2341 tightly and the push member 233 is disposed with a projecting part 2331 corresponding to the stop slot 2342. The projecting part 2331 is fastened and locked into the stop slot 2342. The width of the push member 233 is larger than the width of the window 31 so that the cover 30 is stopped between the finger-operated member 23 and the push member 233.

In order to assemble and fix the cover 30 on the stock, at least one set of symmetrical inner slots 16 is set on the stock, outside the turning channel 12. At least one set of symmetrical tenons 32 is disposed on an inner surface of the cover 30. The tenons 32 are mounted into the corresponding inner slots 16 so as to fasten and fix the cover 30 on the stock.

Refer from FIG. 10 to FIG. 14, theses are schematic drawings showing an embodiment of a finger-operated switch of the present invention applied to the water gun 100 viewed from a different angle, including a front view, a left side view, a right side view, a top view and a bottom view in sequence. This product has been mass-produced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A water gun, comprising: a main body having an intake channel, a turning channel, and an outlet channel connected in sequence for guiding a water flow passing from said intake channel to said outlet channel through said turning channel, wherein said main body comprises a waterproof gasket, which has a penetrating outlet, sealed at and disposed in said outlet channel at a position that one end of said waterproof gasket is projected into said turning channel; and a finger-operated switch, which comprises: a rotating shaft rotatably disposed in said turning channel; a waterproof spacer which is coupled at said rotating shaft and located within said turning channel, wherein said waterproof spacer comprises a curved plate having an outer curved surface sealed at and contacted with an inner wall of said turning channel; and a finger-operated member coupled with said rotating shaft to drive said waterproof spacer between an opened position and a closed position, wherein when said rotating shaft is driven to rotate via said finger-operated member at said opened position, said outer curved surface of said waterproof spacer is slid and moved away from said outlet channel for allowing said water flow passing from said intake channel to said outlet channel through said turning channel, wherein when said rotating shaft is driven to rotate via said finger-operated member at said closed position, said outer curved surface of said water proof spacer is slid and moved to seal at said outlet channel for stopping said water flow to said outlet channel, wherein at said closed position, said waterproof spacer is pushed, via water pressure within said turning channel, toward said outlet channel to further seal with said end of said waterproof gasket so as to enhance a water sealing effect of said waterproof spacer; wherein said rotating shaft has a stop groove provided at one side of said rotating shaft, wherein said waterproof spacer further has a long convex which is extended from said curved plate and is mounted at said stop groove of said rotating shaft, wherein a gap is formed between said long convex and said stop groove to allow said waterproof spacer being moved in relative to said rotating shaft.

2. The water gun, as recited in claim 1, wherein said waterproof spacer is floatable.

3. The water gun, as recited in claim 1, wherein said curved plate has an inner curved surface, wherein said long convex is extended from said inner curved surface to couple at said stop groove, wherein said inner curved surface of said curved plate is attached to and contacted with a side end surface of said stop groove of said rotating shaft.

4. The water gun, as recited in claim 2, wherein said curved plate has an inner curved surface, wherein said long convex is extended from said inner curved surface to couple at said stop groove, wherein said inner curved surface of said curved plate is attached to and contacted with a side end surface of said stop groove of said rotating shaft.

5. The water gun, as recited in claim 1, wherein said rotating shaft further comprises two cap symmetrically coupled at two ends of said rotating shaft to sealedly close two opening ends of said turning channel respectively, wherein each of said caps has a circular slot and a seal ring mounted at said circular slot, wherein said seal rings are sealed at said inner wall of said turning channel to seal said opening ends of said turning channel respectively.

6. The water gun, as recited in claim 4, wherein said rotating shaft further comprises two cap symmetrically coupled at two ends of said rotating shaft to sealedly close two opening ends of said turning channel respectively, wherein each of said caps has a circular slot and a seal ring mounted at said circular slot, wherein said seal rings are sealed at said inner wall of said turning channel to seal said opening ends of said turning channel respectively.

7. The water gun, as recited in claim 5, wherein said finger-operated member comprises a push member and two parallel clip-on workpieces which are extended from said push member and are coupled to outer sides of said caps respectively, wherein when said push member is moved at either a forward direction or a backward direction, said rotating shaft is driven to rotate within said turning channel so as to move said waterproof spacer between said opened position and said closed position.

8. The water gun, as recited in claim 6, wherein said finger-operated member comprises a push member and two parallel clip-on workpieces which are extended from said push member and are coupled to outer sides of said caps respectively, wherein when said push member is moved at either a forward direction or a backward direction, said rotating shaft is driven to rotate within said turning channel so as to move said waterproof spacer between said opened position and said closed position.

9. The water gun, as recited in claim 7, wherein each of said cap further has a fastening slot formed at said outer side of said cap, wherein said finger-operated member further comprises a projecting piece provided at an inner side of each of said clip-on workpieces and coupled with said fastening slot of said cap, so as to enable said rotating shaft being driven to rotate by said push member.

10. The water gun, as recited in claim 8, wherein each of said cap further has a fastening slot formed at said outer side of said cap, wherein said finger-operated member further comprises a projecting piece provided at an inner side of each of said clip-on workpieces and coupled with said fastening slot of said cap, so as to enable said rotating shaft being driven to rotate by said push member.

11. The water gun, as recited in claim 10, wherein an orientation of said intake channel is perpendicular to an orientation of said outlet channel.

12. The water gun, as recited in claim 10, wherein said main body further comprises a stop collar, having a penetrating channel, welded at an outlet of said outlet channel and tightly coupled at said penetrating outlet of said waterproof gasket.

13. The water gun, as recited in claim 11, wherein said main body further comprises a stop collar, having a penetrating channel, welded at an outlet of said outlet channel and tightly coupled at said penetrating outlet of said waterproof gasket.

14. The water gun, as recited in claim 13, wherein said waterproof gasket is made of soft material while said waterproof spacer is made of hard material.

15. The water gun, as recited in claim 8, further comprising a cover having a window provided thereon, wherein said cover couples at said main body at a position over said turning channel and covers said clip-on workpieces of said finger-operated member, wherein said push member is extended through said window of said cover and is exposed out of said cover.

16. The water gun, as recited in claim 14, further comprising a cover having a window provided thereon, wherein said cover couples at said main body at a position over said turning channel and covers said clip-on workpieces of said finger-operated member, wherein said push member is extended through said window of said cover and is exposed out of said cover.

17. The water gun, as recited in claim 16, further comprising at least one set of symmetrical inner slots formed at said main body at a position outside said turning channel, and at least one set of symmetrical tenons disposed on an inner surface of said cover and engaged with said inner slots respectively.

18. A water gun, comprising:

a main body having an intake channel, a turning channel, and an outlet channel connected in sequence for guiding a water flow passing from said intake channel to said outlet channel through said turning channel, wherein said main body comprises a waterproof gasket, which has a penetrating outlet, sealed at and disposed in said outlet channel at a position that one end of said waterproof gasket is projected into said turning channel; and a finger-operated switch, which comprises:

a rotating shaft rotatably disposed in said turning channel;

a waterproof spacer which is made of floatable material and is located within said turning channel, wherein said waterproof spacer is coupled at said rotating shaft in such a manner that a gap is defined therebetween for allowing said waterproof spacer to be moved and floated within said turning channel and to be rotated in said turning channel, wherein said waterproof spacer comprises a curved plate having an outer curved surface sealed at and contacted with an inner wall of said turning channel; and a finger-operated member coupled with said rotating shaft to drive said waterproof spacer between an opened position and a closed position, wherein when said rotating shaft is driven to rotate via said finger-operated member at said opened position, said outer curved surface of said waterproof spacer is slid and moved away from said outlet channel for allowing said water flow passing from said intake channel to said outlet channel through said turning channel, wherein when said rotating shaft is driven to rotate via said finger-operated member at said closed position, said outer curved surface of said waterproof spacer is slid and moved to seal at said outlet channel for stopping said water flow to said outlet channel, wherein at said closed position, said waterproof spacer is pushed and floated in said turning channel, via water pressure within said turning channel, toward said outlet channel to further seal with said end of said waterproof gasket so as to enhance a water sealing effect of said waterproof spacer.

19. The water gun, as recited in claim 18, wherein said waterproof gasket is made of soft material while said waterproof spacer is made of hard material.

* * * * *